(No Model.)

J. L. HOUSE.
AXLE NUT.

No. 444,053. Patented Jan. 6, 1891.

Witnesses:
J. Jessen
C. L. Hawley

Inventor:
Joseph L. House.
By Paul & Merwin Attys.

UNITED STATES PATENT OFFICE.

JOSEPH L. HOUSE, OF MINNEAPOLIS, MINNESOTA, ASSIGNOR OF ONE-HALF TO PETER B. CHRISTIAN AND PETER FABER, OF SAME PLACE.

AXLE-NUT.

SPECIFICATION forming part of Letters Patent No. 444,053, dated January 6, 1891.

Application filed October 13, 1890. Serial No. 367,927. (No model.)

*To all whom it may concern:*

Be it known that I, JOSEPH L. HOUSE, of Minneapolis, in the county of Hennepin and State of Minnesota, have invented certain Improvements in Adjustable Axle-Nuts for Running Vehicles, of which the following is a specification.

My invention relates to means whereby all wear between the ends of the hub and the axle-shoulder and nut may be readily taken up and the inner face of the nut tightened against the end of the hub, so as to prevent longitudinal play thereof upon the axle.

The object of my invention is to prevent the chucking about of the wheels of a vehicle and to thereby prolong the usefulness of the same.

My invention consists in the combination, with an axle having a threaded end, of a nut adapted to be screwed upon the same, the inner face of said nut being provided with a recess into which the shouldered end of the axle is adapted to enter, holes in said nut, a long slot in the end of the axle, and a self-locking pin or key adapted to be inserted in said holes and said slot, whereby said nut may be locked in any desired longitudinal position upon the threaded end of the axle.

My invention consists, further, in various details of construction and in combinations hereinafter described, and particularly pointed out in the claims.

Figure 1:
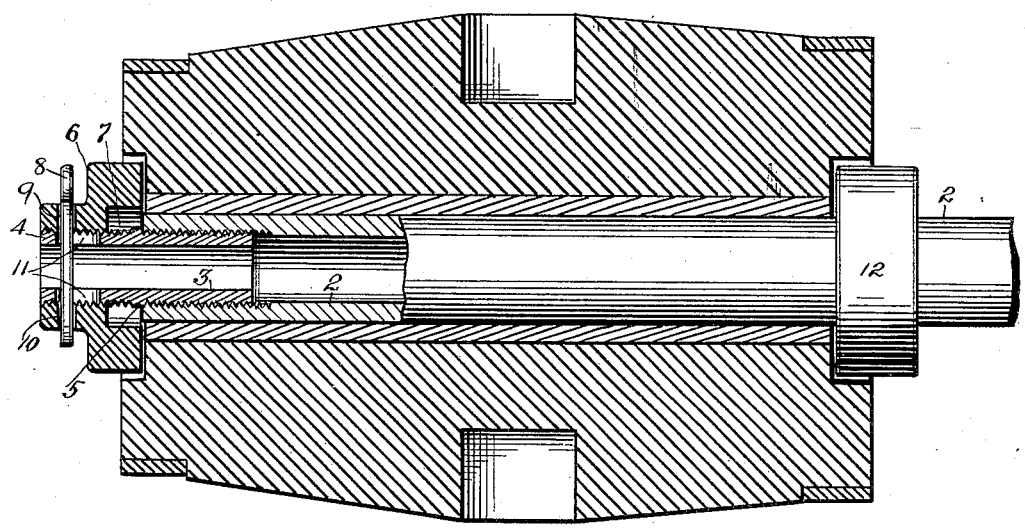
Figure 2:
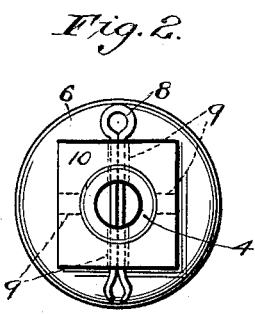
Figure 3:
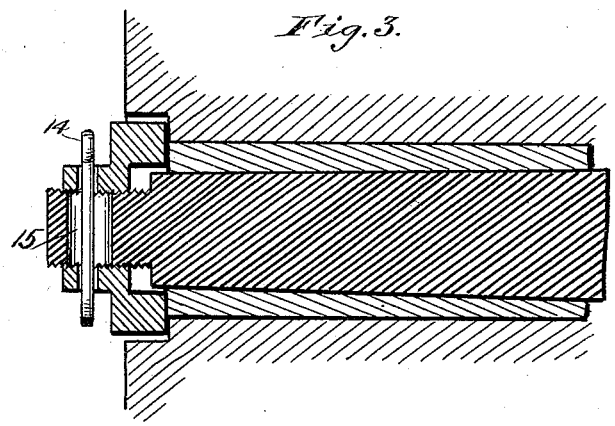

In the accompanying drawings, forming a part of this specification, Figure 1 is a longitudinal sectional elevation of a wagon axle and hub and an adjustable nut embodying my invention. Fig. 2 is a view of the outer end of the nut, showing the spring locking-pin in position. Fig. 3 is a sectional longitudinal elevation showing the nut applied to a solid axle.

As shown in Fig. 1 of the drawings, I have applied my adjustable nut to a hollow axle 2. It is necessary in this case to provide the sleeve 3, screwed into the end of the axle proper and provided with the threaded portion 4, projecting beyond the end of the axle. In order to prevent the sleeve 3 from being screwed too far into the end of the hollow axle, a space equal to one or two threads is left uncut in the middle of the sleeve, as shown at 5. The threads on the inner end of the sleeve are pitched either right or left, according to the side of the wagon upon which they are placed, so as to be constantly tightened as the wagon-hub revolves and presses against the nut. The outer end of the sleeve, however, may practically be threaded without regard to the direction in which the wheels revolve, as it will be seen that the nut is prevented from unscrewing by the locking device provided in connection therewith.

The main feature of the nut 6 consists in the recess 7, provided in the inner part thereof. As shown, this recess is of such diameter as to freely admit the end of the hollow shaft 2 into the same as the hub wears down and the nut is tightened up.

After a wagon built in the ordinary way has been used a considerable length of time the ends of the hubs, through constant friction with the nut and the axle-shoulder, become worn down to such an extent as to allow the wheels to move from side to side longitudinally on the axles, thus subjecting all of the parts of the vehicle, and especially the wheels and axles, to strain and injury.

By the use of the recessed axle-nuts I am enabled to screw the nuts tightly against the ends of the hubs without regard to whether the axles are too long or too short, and by means of the locking devices lock the nuts in the desired positions, and thus at all times limit the play of the hubs. Thus in this respect the vehicle is kept as good as new.

The locking device is shown to consist in a spring-pin 8, adapted to be inserted through suitable oppositely-placed openings 9 in the square portion or head 10 of the nut and through the slotted openings 11 in the threaded end of the axle. This pin or key serves to prevent the turning of the nut while the threads of the nut engaging with those on the axle prevent the nut from pulling off. Hence after the pin has been placed in position it is impossible for the nut to move from its position to loosen its bearing against the end of the hub.

It will be seen that the slot or slots 11 are several times as long as the diameter of the holes in the head 10. I will say that the hub has been worn off to such an extent that it does not fully fill in between the nut 6 and the axle-shoulder 12. I will say that the distance is something over an eighth of an inch. The nut would be tightened against the hub by first pulling out the pin 8 and then screwing in the nut the distance of an eighth of an inch on the end of the axle, thus bringing the inner face of the nut against the end of the hub. The openings 9 in the nut would then be brought in line with the slots 11, which are of such length as to still lie beneath these openings, and the pin driven back through the head of the nut and the end of the axle, thereby securing the nut firmly in position.

In order to obtain a fine adjustment of the nut, I provide means whereby it may practically be locked in any position upon the axle. When making use of the spring-pin form of lock, I accomplish this by providing one or more sets of oppositely-placed openings 9 in the head of the nut, as indicated by the dotted lines in Fig. 2, or I may provide several of the slots in the end of the axle; but as this weakens the device I preferably make use of the several openings in the nut. With this arrangement it will be seen that the axle-nut is made capable of adjustment at each quarter-turn.

When the adjustable nut is used upon the end of a solid axle, the device is simplified, inasmuch as the use of the threaded sleeve 3 is dispensed with. The long slot 15 is extended directly through the end of the axle, as shown in Fig. 3. It is obvious that the same nut used in Fig. 1 may be employed on the end of the solid axle.

In Fig. 3 the end of the hub is shown to have been worn to such an extent as not to come out even with the shoulders on the end of the axle, and in order to tighten the end bearings of the hub the adjustable nut has been screwed in against the hub and the locking-pin 14 inserted through the slot 15, standing, as shown, about midway between the ends thereof.

Having thus described my invention, I claim as new and desire to secure by Letters Patent—

1. The combination, in a device of the class described, of the threaded end of the axle with the adjustable nut, the recess in said nut of greater diameter than that of the end of the axle, one or more sets of oppositely-placed openings extending transversely through said nut, a slot or slots in the end of the axle, and a pin or key adapted to be inserted through the openings in the nut and through said slot, substantially as and for the purpose specified.

2. The combination, in a device of the class described, of the axle having the slotted and threaded end, with the nut 6, the recess 7 in said nut, the openings 9 in the nut, and the pin or key adapted to be inserted through said openings and the slotted end of the axle, substantially as described.

3. The combination of the axle 2 with the sleeve 3, having the threaded outer end 4, the slots 11 in said ends 4, the nut 6, having the recess 7 of greater diameter than the end of the axle 2, openings 9, provided in the nut, and the spring key or pin 8, adapted to be inserted through opposite pairs of said openings and through the slot 11 to lock said nut upon the end of the axle and against the end of the hub, substantially as described.

In testimony whereof I have hereunto set my hand this 3d day of October, 1890.

JOSEPH L. HOUSE.

In presence of—
A. M. GASKILL,
C. G. HAWLEY.